US007401192B2

(12) United States Patent
Stakutis et al.

(10) Patent No.: US 7,401,192 B2
(45) Date of Patent: Jul. 15, 2008

(54) METHOD OF REPLICATING A FILE USING A BASE, DELTA, AND REFERENCE FILE

(75) Inventors: Christopher John Stakutis, Concord, MA (US); Erik Dean Wilkinson, Nashua, NH (US); Hong Li, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 10/958,724

(22) Filed: Oct. 4, 2004

(65) Prior Publication Data

US 2006/0075004 A1    Apr. 6, 2006

(51) Int. Cl.
*G06F 12/00*    (2006.01)
*G06F 13/00*    (2006.01)
*G06F 13/28*    (2006.01)

(52) U.S. Cl. .................. 711/162; 711/161; 707/203; 707/204

(58) Field of Classification Search .................. 711/162
See application file for complete search history.

(56) References Cited

U.S. PATENT DOCUMENTS

| 5,634,052 | A |   | 5/1997  | Morris |
|---|---|---|---|---|
| 6,269,381 | B1 | * | 7/2001  | St. Pierre et al. ............. 707/202 |
| 6,477,544 | B1 |   | 11/2002 | Bolosky et al. |
| 6,549,918 | B1 |   | 4/2003  | Probert, Jr. et al. |
| 6,604,236 | B1 | * | 8/2003  | Draper et al. ............... 717/170 |
| 6,651,075 | B1 | * | 11/2003 | Kusters et al. ............... 707/204 |
| 2002/0147849 | A1 | * | 10/2002 | Wong et al. ................. 709/246 |
| 2003/0018657 | A1 |   | 1/2003  | Monday |
| 2003/0182325 | A1 |   | 9/2003  | Manley et al. |

OTHER PUBLICATIONS

IBM, Corp. *IBM Tivoli Storage Manager. Smart Moves*. 2 pages [online] [retrieved on Jul. 22, 2004] Available from http://www-306.ibm.com/software/tivoli/products/storage-mgr/smart-moves.html (2 pages.
IBM, Corp. "International Technical Support Organization. IBM Tivoli Storage Management Concept. Jul. 2003." Fourth Edition., Document No. SG24-4877-03, Title and Copyright (2 pages); Contents (iii-xii); Part 1, *Storage Concepts*, Title Pages (pp. 1-2); Part 1, Chapter 1, *Introduction to IBM Tivoli Storage Manager* (pp. 3-22); Part 2, Chapter 5, *Backup and Restore Operations* (pp. 69-82); Part 2, Chapter 6, *Backup-Archive Client* (pp. 83-144).

* cited by examiner

*Primary Examiner*—Donald Sparks
*Assistant Examiner*—Prasith Thammavong
(74) *Attorney, Agent, or Firm*—David W. Victor; Konrad Raynes & Victor LLP

(57) ABSTRACT

Provided are a method, system, and program for replicating a file. A file is copied to a target storage file system stored as a base file. A reference file comprising the copied file is generated at a local storage. An update is applied to the file at the local storage. A delta file is generated indicating differences between the updated file at the local storage and the reference file. A file system command is used to transmit the delta file to the target storage file system store to store in a directory of the target storage file system, wherein the file in the local storage is replicated at the target storage by a combination of the base file and the delta file.

6 Claims, 4 Drawing Sheets

Delta File Name

METHOD OF REPLICATING A FILE USING A BASE, DELTA, AND REFERENCE FILE

BACKGROUND OF THE INVENTION

1. Field of the Invention

The present invention relates to a method, system, and program for replicating a file.

2. Description of the Related Art

File replication involves maintaining a copy (replica) of a file on a remote storage that may be updated locally. Any local updates applied to the file subject to replication are copied over (replicated) to the remote storage. For instance, the International Business Machines ("IBM"®) Tivoli® Storage Manager product provides software for a client and server systems so that the client system backs-up only a changed portion of a file on the server, either on byte level or on block level, instead of transferring the whole file to the server every time. (IBM and Tivoli are registered trademarks of IBM) The changed file portion is backed up as a differential backup relative to the last complete backup of the file (base or reference file) and it is called delta file. All changes since the last complete backup of the file are included in this delta file. In the case of a restore, software provides for the restore of the whole file by restoring only two sub-file components, one delta file and the last complete backup of the whole file, the base file.

The IBM Tivoli Storage Manager requires that the replication operations are implemented in software programs that run on both the client and the server storage receiving the delta files. Thus, proprietary agent software is implemented in both the endpoints, client and server machines, to exchange information and messages as part of the replication process.

SUMMARY

Provided are a method, system, and program for replicating a file. A file is copied to a target storage file system stored as a base file. A reference file comprising the copied file is generated at a local storage. An update is applied to the file at the local storage. A delta file is generated indicating differences between the updated file at the local storage and the reference file. A file system command is used to transmit the delta file to the target storage file system store to store in a directory of the target storage file system, wherein the file in the local storage is replicated at the target storage by a combination of the base file and the delta file.

In an additional embodiment, a request is received to access a file in a file system in a storage device. A determination is made as to determining whether there is a delta file for the requested file providing changes to a base file in the storage device. The changes in the delta file are applied to the base file for the accessed file to produce a current version of the file in response to determining that there is a delta file. The current version of the file is generated on an output device.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
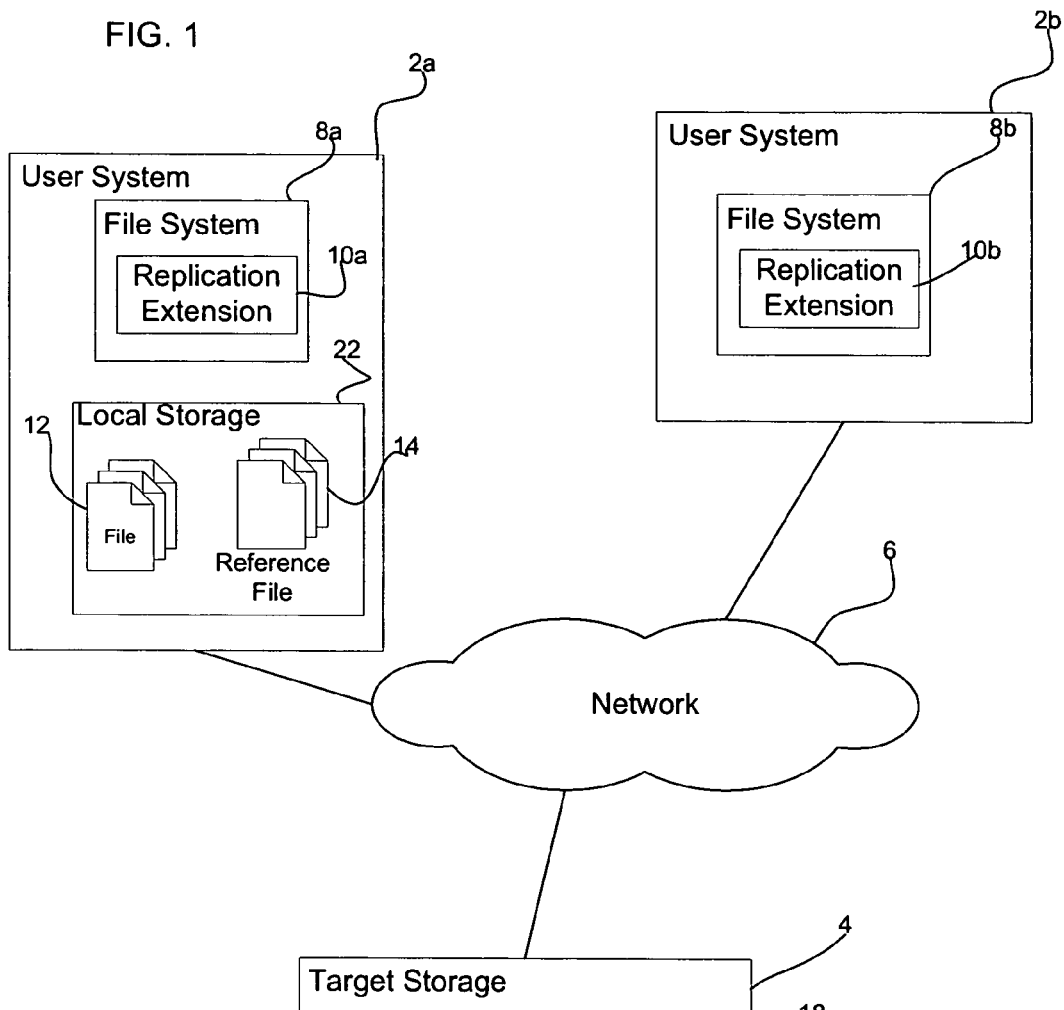
FIG. 1 illustrates an embodiment of a network computing environment.

FIG. 1 illustrates a network computing environment having a plurality of user systems 2a and 2b (two are shown) that communicate with a target storage 4 over a network 6. The user systems 2a and 2b include a file system 8a, 8b, which includes a replication extension 10a, 10b component. If the user of the user system 2a designates that a file 12 is subject to replication in the target storage 4, then the replication extension 10a, 10b monitors requests directed to the file 12 subject to replication to ensure modifications are transferred to the replication site, i.e., target storage 4. The replication extension 10a, 10b may execute in the kernel space of the user systems 2a, 2b with the file system 8a, 8b.

The replication extension 10a maintains a reference file 14 comprising a copy of the base file 12 sent to the target storage 4, where the base file is stored as file 16 in a target storage file system 18. The replication extension 10a places any updates to the file 12 in a delta file 20 and transmits the delta file 20 to the target storage 4 to store in the target storage file system 18. The files 12 being replicated and their corresponding reference files 14 may be stored at a local storage 22 connected to the user system 2a, such as an attached storage device or local hard disk drives or memory. In an alternative embodiment, the target storage 4 may comprise a hard disk drive or storage unit within or directly coupled to the user system 2a from which the file 12 is being sent, so that replication occurs locally at the user system 2a on a local hard drive, such as an internal or external hard disk drive coupled directly to the user system 2a.

In certain embodiments, the replication extension 10a uses a standard file system 8a, 8b command, such as a copy or save command, to transfer the delta file 20 to the target storage file system 18. In further embodiments, the replication extension 10a may use an internal file Application Program Interface (API) command or a network transfer protocol command, such as a File Transfer Protocol (FTP) command to send a file. The delta file 20 may comprise an ordinary file in the target file system 18. The replication extension 10b may perform the operations described with respect to replication extension 10a. The replication extensions 10a, 10b further intercept requests to access files 16 in the target storage system as described below.

A file 12 replicated in the target file system 18 has a base file 16 initially sent from the user system 2a and a delta file 20. In one embodiment, the delta file 20 may have the same name as the file 16, such as the name and application type extension, plus an additional extension indicating that the file is a delta file, e.g., "x.type.delta". In one embodiment, the delta file has a file name indicating an attribute of the delta file and base file. For instance, the attribute included in the delta file 20 file name may include a file size of the current version of the file, comprising the base file 16 combined with the differences indicated in the delta file 20. Further, the attribute included in the delta file 20 file name may comprise a code identifying the reference file 14, i.e., initial base file, to which the delta file 20 applies. The replication extension 10a, 10b uses this code to check whether the file 16 in the target file system 18 matches the reference file 14, which is the copy of the initial base file from which the delta file 20 was generated, so that the file produced by combining the base file 16 and the delta file 20 in the target file system 18 is the same updated file for which the delta file 20 was generated. In one embodiment, the code comprises a checksum value derived by applying a checksum function to the reference file 14, which is the original base file in the user system 2a, and embedding that checksum value in the name of the delta file 20. The replication extension 10a, 10b may then apply the same checksum function to the base file 16 in the target file system 18 to determine whether the base file 16 in the target storage 4 has not changed and is the same as the reference file 14 on the user system 2a, so that when the delta file 20 is applied to the base file 16 in the target file system 18 the resulting updated file is the same as the current version of the file 12 in the user system 2.

In one embodiment, the base file 16 and delta file 20 may be stored in a common directory in the target storage file system 18. For instance, they might be in the same directory or have a common higher level directory, e.g., parent directory. Further, the delta file 20 may be stored in a predetermined directory location relative to the base file 16, such as in a subdirectory of the directory including the delta file 20, a directory storing delta files 20 for different base files 16, or the same directory as the base file 16.

The users systems 2a, 2b may comprise any computing device capable of submitting requests or transactions over the network 6 to the target storage 4, including desktop computers, notebook computers, workstations, hand held computers, servers, mainframes, telephony devices, etc. The user systems 2a, 2b may also comprise host systems or servers including storage devices having files updated by other network devices. The target storage 4 may comprise a storage device or system known in the art having a file system 20, including a Redundant Array of Independent Disks (RAID), interconnected hard disk drives, a tape library, an optical library, a network attached storage (NAS), etc. The target storage 4 further includes a controller to execute requests for files in the target storage file system 20. The network 6 may comprise one or more networks known in the art, such as a Wide Area Network (WAN), Local Area Network (LAN), Storage Area Network (SAN), wireless network, the Internet, and Intranet, etc. The file system 8a, 8b may comprise the file system component of operating systems known in the art, such as Microsoft Corporation's Windows®, LinUX™, Unix®, etc. (Windows is a registered trademark of Microsoft Corporation, Linux is a trademark of Linus Torvalds, and Unix is a registered trademark of The Open Group.)

Figure 2:
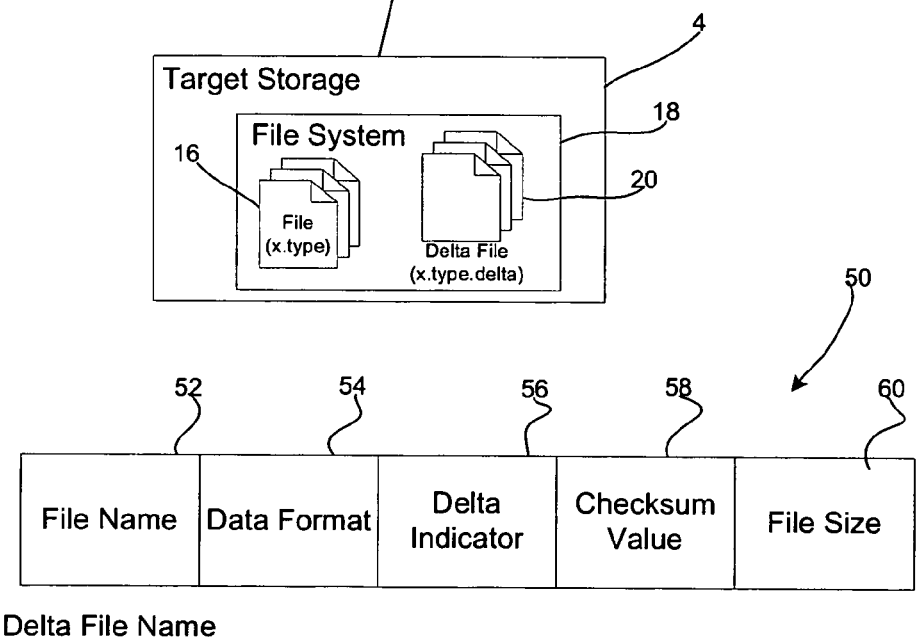
FIG. 2 illustrates an embodiment of a file name of a delta file.

FIG. 2 illustrates an embodiment of information included in a delta file 20 file name 50, including a file name 52 portion comprising the file name, e.g., "X" as shown in FIG. 1; a data format 54 or file type, e.g., "type" in FIG. 2, indicating a format of the data or the application for which the data is intended; and a delta extension indicator 56 indicating that the file is a delta file providing updates to a base file having a name comprising the file name 52 and data format 54 components of the delta file name 50, e.g., "x.type", which are the first two components of the delta file name x.type.delta" shown in FIG. 1. A checksum value 58 comprises a checksum of the reference file 12, which is the base file the user system 2a initially transmitted to the target storage 4. The file size 60 comprises a file size of the current version of the file, comprising the reference file 12 combined with the updates in the delta file 20.

In certain embodiments, each delta file 20 comprises a differential backup file including all changes that have been applied to the base file 12, stored as the reference file 14, that was copied to the base file 16 in the target storage 4. In alternative embodiments, there may be multiple incremental delta files for a file 12, where each incremental delta includes changes since the last modification to the file. In such incremental delta embodiments, multiple incremental delta files would be stored in the target storage file system 18 supplying the modifications to the base file 16 that produce the current version of the file 12.

Figure 3:
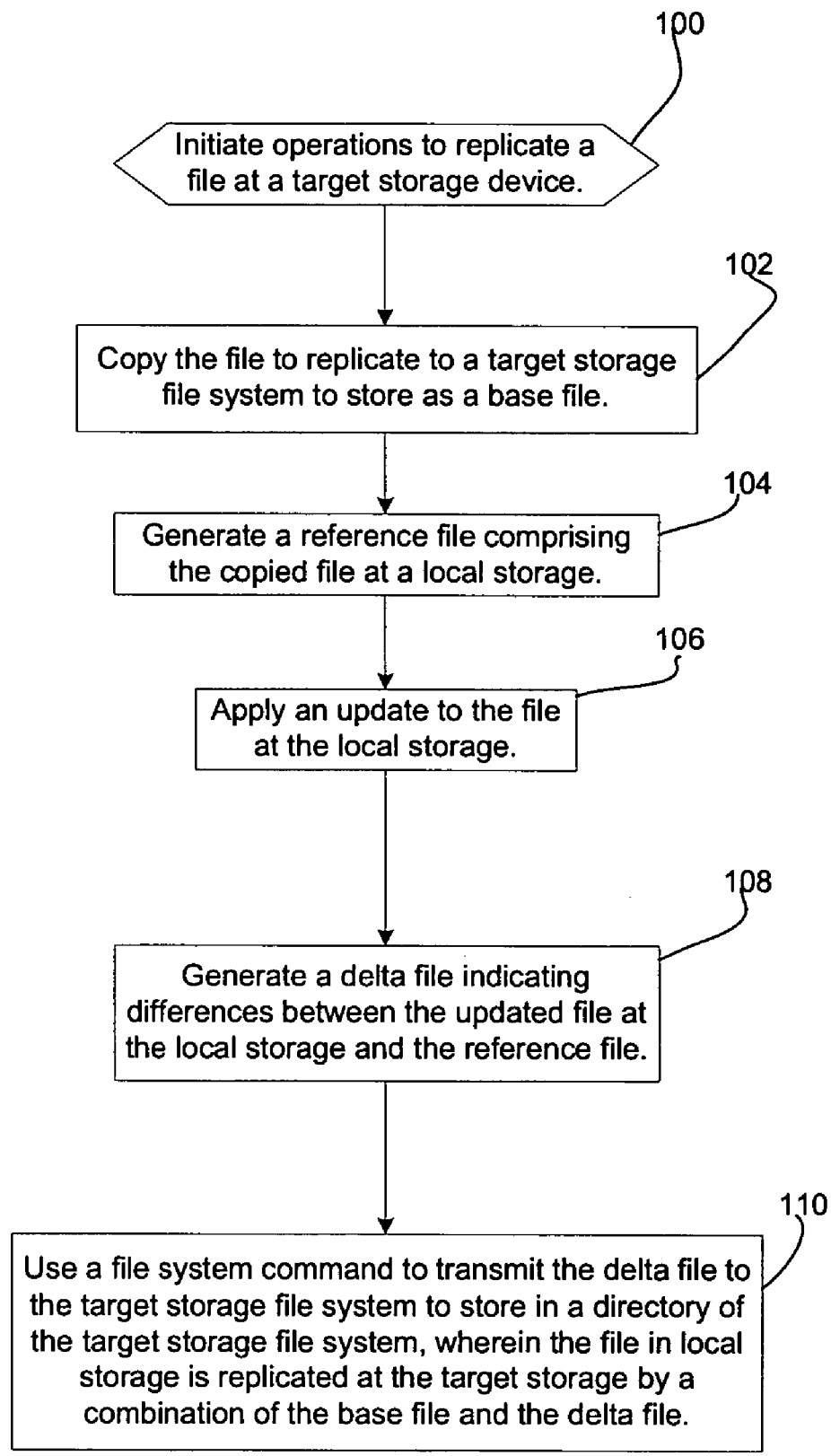
FIGS. 3, 4, and 5, illustrate embodiments of operations to replicate a file on a storage.

FIG. 3 illustrates an embodiment of operations performed by the replication extension 10a to maintain a replica of a file 12 at the user system 2a in the target storage 4. Operations described with respect to replication extension 10b may be performed by other replication extensions 10b to file systems 8b in the network 6. Upon initiating (at block 100) operations to replicate a file 12 at a target storage device 4, the replication extension 10a copies (at block 102) the file 12 to replicate to a target storage file system 18, which is stored as base file 16. In one embodiment, the replication extension 10a may use a standard file system command to transfer the file 12 to the target storage file system 18, such as a copy or save command. Transmitting the delta files using standard file system commands avoids the use of additional protocol layers in the user systems 2a, 2b and target storage 4 to handle the transfer of delta files. The replication extension 10a generates (at block 104) a reference file 14 comprising the copied file 12 at a local storage 22. An update to the file 12 at the local storage 22 is applied (at block 106). The replication extension 10a, which may be triggered in response to a modification of the file 12 subject to replication, then generates (at block 108) a delta file 20 indicating differences between the updated file at the local storage 22 and the reference file 14. The generated delta file 20 may have the file name of the file 12 being replicated including in the file name 52 field, data format/data type 54, delta indicator 56, checksum value 58 determined by applying a checksum function to the initial file 12 (copied as the reference file 14), and a file size 60 of the updated file 12. The replication extension 10a uses (at block 110) a file system command, e.g., copy or save command, to transmit the delta file 20 to the target storage file system 18 to store in a directory of the target storage file system 18. The file 12 in the local storage 22 is replicated at the target storage 4 by the combination of the base file 16 and the delta file 20. Further, the delta file 20 and base file 16 may be stored as ordinary files in the target storage file system 18.

In one embodiment, the replication extension 10a, 10b may detect changes to files 12 subject to replication and in response perform the operations at block 108 and 110. The operations at block 102 and 104 may be performed when a file 12 is initially subject to replication. Further, if the delta file 20 exceeds the base file 12 by a certain threshold, e.g., 60%, then the current version of the file 12 may be transmitted to the target storage 4 to replace the base file 16 and a new reference file 14 may be created for the current version of the file 12 so that deltas will be applied to the current version of the file 12.

Figure 4:
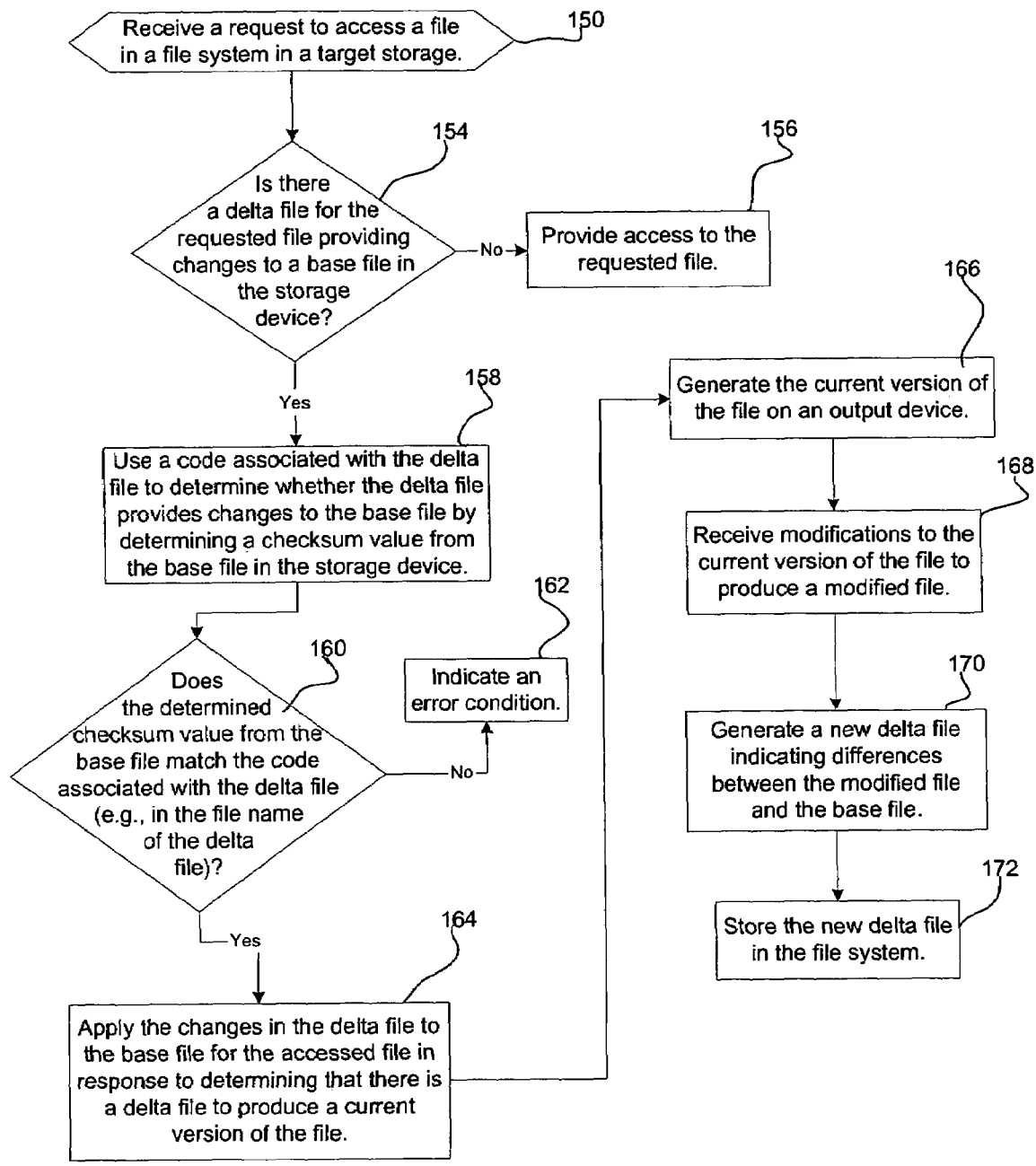

FIG. 4 illustrates operations implemented in a replication extension 10a, 10b to access a file subject to replication. Upon receiving (at block 150) a request to access a file 12 in file system 18 in a storage device, e.g., target storage 4, the replication extension 10a, 10b determines (at block 154) whether there is a delta file 20 for the requested file providing changes to a base file 12 in the storage 4. If not, then access is provided (at block 156) to the requested file. Otherwise if there is a delta file 20, then the replication extension 10b uses (at block 158) a code associated with the delta file 20 to determine whether the delta file provides changes to the base file. Using the code may comprise determining a checksum value from the base file 16 in the storage device 4 by a applying a checksum function to the base file 16. Further, a determination is made (at block 160) as to whether the determined checksum value from the base file 16 matches the code, e.g., checksum value 58, associated with the delta file (e.g., component 58 in the file name 50 (FIG. 2) of the delta file 20). If (at block 160) the checksums do not match, then the file 16 in the target storage 4 may have been modified and is different from the base file stored as the reference file 14. In such case, an error condition is indicated (at block 162). Otherwise, if (at block 160) the checksums match (which occurs if the file 16 at the target storage 4 is the initial base file copied over, which is stored as the reference file 14 in the local storage 22), then the changes in the delta file 20 are applied (at block 164) to the base file 12 for the accessed file to produce a current version of the file, which should match the updated file 12 in the user system 2a. The replication extension 10a, 10b then generates (at block 166) the current version of the file on an output device (not shown), which may comprise a video display monitor, paper, etc.

With certain embodiments, the replication extension 10a, 10b may generate the current version to the user transparently. Thus, a user in a standard application, such as a word processing application, may open a dialogue box to view a list of files and will see a list that does not show any delta files 20, only the base file 16 names. If the user selects to open one of the displayed files, then the replication extension 10a, 10b would generate the current version comprising the base file 16 combined with the delta file 20. The replication extension 10a, 10b operations occur transparently to the user without requiring the user to invoke any additional applications.

Upon the file system 8a, 8b receiving (at block 168) modifications to the current version of the file to produce a modification to the file in the target storage 4, the replication extension 10a, 10b generates (at block 170) a new delta file indicating differences between the modified file and the base file 16 in the target storage file system 18. The new delta file 20 is stored (at block 172) in the target file system 18.

Figure 5:
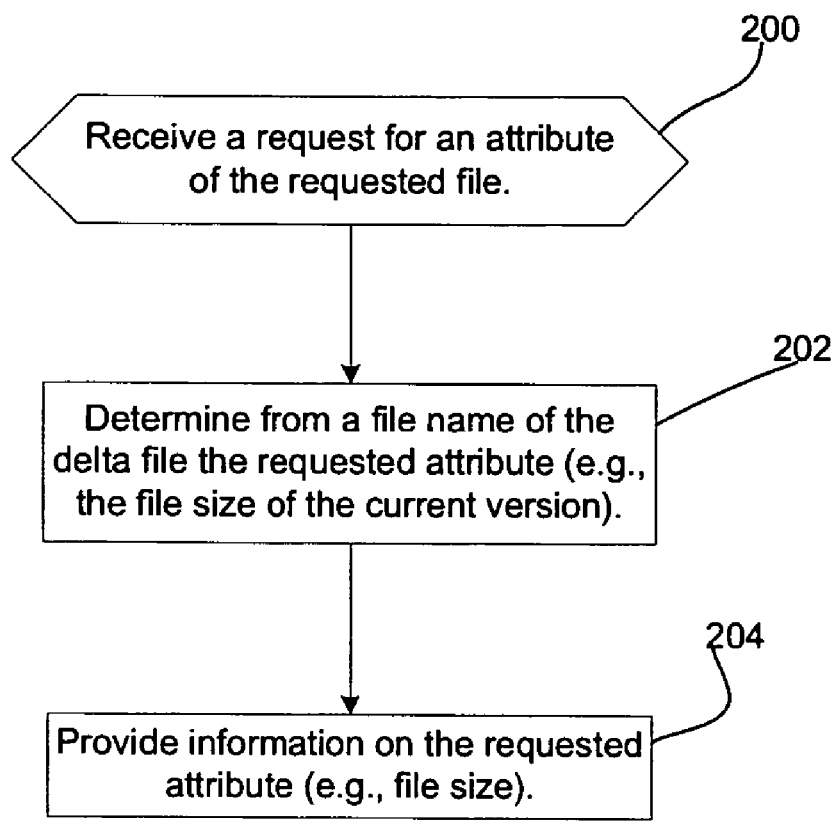

FIG. 5 illustrates operations performed by the replication extension 10a, 10b to provide information on attributes of a replicated file. Upon receiving (at block 200) a request for an attribute of the requested file, such as the file size, the replication extension 10a, 10b determines (at block 202) from a file name 50 (FIG. 2) of the delta file 20 the requested attribute (e.g., the file size of the current version). For instance, in FIG. 2 the file size attribute is indicated in component 60 of the file name 50. The replication extension 10a, 10b then provides (at block 204) information on the requested attribute (e.g., file size).

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain operations described as performed by the replication extension may be performed by the file system.

The illustrated operations of FIGS. 3-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
copying a file in a local storage subject to replication to a target storage file system to store as a base file in the target storage file system;
generating a reference file comprising a copy of the file subject to replication that is copied to the target storage file system;
applying an update to the file subject to replication at the local storage to generate an updated file at the local storage;
generating a delta file indicating differences between the updated file at the local storage and the reference file;
generating a code identifying the reference file;
using a file system command to transmit the delta file to the target storage file system to store in a directory of the target storage file system;
receiving a replication request to replicate the updated file from the delta file in the target storage file system;
using the code to determine whether the base file at the target storage file system matches the reference file at the local storage in response to the replication request; and
replicating the updated file from a combination of the base file and the delta file stored in the target storage in response to determining that the base file matches the reference file.

2. The method of claim 1, wherein the base file and delta file are stored in a common directory in the target storage file system.

3. The method of claim 2, wherein the delta file is stored in a predetermined directory location relative to the base file.

4. The method of claim 1, wherein the delta file has a file name including a file name of the base file and includes an extension indicating a delta file type.

5. The method of claim 1, wherein a file name of the delta file comprises a file size of the reference file on the local storage combined with the differences indicated in the delta file.

6. The method of claim 1, wherein a file name of the delta file indicates the code identifying the reference file to which the delta file applies.

* * * * *